US005770901A

United States Patent [19]

Niimi et al.

[11] Patent Number: 5,770,901

[45] **Date of Patent: *Jun. 23, 1998**

[54] STARTER WITH OVERHEAT PROTECTION

[75] Inventors: Masami Niimi, Handa; Tsutomu Shiga, Nukata-gun, both of Japan

[73] Assignee: Nippondenso, Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 681,962

[22] Filed: Jul. 30, 1996

[30] Foreign Application Priority Data

Oct. 31, 1995 [JP] Japan .................................... 7-282322

[51] Int. Cl.$^{6}$ ........................... H01H 67/02; H02K 13/00

[52] U.S. Cl. ........................ 310/52; 310/68 R; 310/68 C; 335/121; 335/126

[58] Field of Search .............................. 310/52, 239, 245, 310/148, 128, 68 R, 68 C; 290/38 R, 39; 335/126, 131

[56] References Cited

U.S. PATENT DOCUMENTS 3,774,407 11/1973 Bright ....................................... 62/157

4,536,669 8/1985 Morishita .............................. 310/68 R 5,528,084 6/1996 Shiga et al. ........................... 290/38 R

FOREIGN PATENT DOCUMENTS 2-290142 11/1990 Japan .

6-74778 9/1994 Japan .

*Primary Examiner*—Steven L. Stephan

*Assistant Examiner*—Tran N. Nguyen

*Attorney, Agent, or Firm*—Cushman, Darby & Cushman IP Group of Pillsbury, Madison, & Sutro LLP

[57] ABSTRACT

A starter motor has an armature, a commutator and brushes slidably supported by a brush holder, and a magnet switch controls motor operation. A switch supporting member supports the magnet switch and an energization control unit accommodating a bimetal switch having a contact therein. The energization control unit opens its inner contact to shut off the current carried to a magnet switch coil when the temperature of heat transferred via switch supporting member, i.e., the heat of the coil transferred via brushes and a switch yoke, reaches a predetermined temperature, thereby stopping motor operation.

16 Claims, 3 Drawing Sheets

STARTER WITH OVERHEAT PROTECTION

BACKGROUND OF THE INVENTION

1. Field of the Invention

The present invention relates to a starter for driving an internal combustion engine and, more particularly, a starter which has an overheat protection structure.

2. Description of Related Art

Recently, due to the increase in electric loads of vehicles, large-sized batteries are used for the large electric capacity. On the contrary, starters are required to be reduced in size and the heat capacity thereof is decreasing. For this reason, when a starter is continuously operated under an overloaded condition with a large capacity battery, thermal damage to the starter is likely to occur by the temperature rise of a starter motor. Further, a continuous operation of the motor in the almost nonloaded condition with a pinion engaged with a ring gear of an engine also causes the thermal damage to the starter.

To prevent these kinds of problems, Japanese Patent Application Publication No. Hei 6-74778, for example, discloses a method which detects the temperature of a coil disposed in a magnet switch and shuts off the current carried to a motor when the detected coil temperature reaches a predetermined temperature.

Further, Japanese Patent Application Laid-open No. Hei 2-290142 discloses a method in which a temperature sensor is attached to a brush to shut off the current carried to a coil in a magnet switch when the detected brush temperature reaches a predetermined temperature.

However, the above-mentioned method of detecting the coil temperature can prevent the thermal damage of starter due to the nonloaded operation, but cannot protect the motor during the continuously loaded operation because the rise in motor temperature is increased while a drop in battery voltage reduces the rise in magnet switch coil temperature compared with the one under nonloaded operation.

Further, according to the method of detecting the brush temperature, since the rise in motor temperature is low when the motor is driven under nonloaded condition, the temperature sensor disposed in the brush takes time to reach a predetermined temperature to shut off motor operation. Therefore, starter damage due to the nonloaded operation cannot be prevented.

SUMMARY OF THE INVENTION

In light of the above-mentioned preblems, the present invention has an object of preventing thermal damage to a starter by means of one temperature sensor over a wide range from alomost nonloaded operation to loaded operation.

According to the present invention, both magnet switch coil temperature and brush temperature are detected by means of one temperature responsive element via heat transfer member. When a starter motor is overheated due to the continuously loaded operation, the heat of the motor is transferred to brushes and the brush temperature is increased. When the brush temperature reaches a predetermined temperature, the current carried to the coil disposed inside the magnet switch is shut off to stop the motor operation, thereby preventing the motor damage. Furthermore, while the motor is driven in nonloaded operation, since the coil disposed inside the magnet switch is overheated even though the rise in the motor temperature is low, when the coil temperature detected via the heat transfer member reaches the predetermined temperature, the current carried to the coil is shut off to stop the motor operation, thereby preventing the motor damage.

Since both the coil temperature and the brush temperature are transferred through the heat transfer member and detected by only one temperature responsive element, thermal damage to the starter can be prevented in low costs over a wide starter operation range from almost nonloaded motor operation to loaded motor operation.

Preferably, the temperature responsive element is disposed between a switch yoke and the brush so that two different temperatures of the switch yoke and the brush can be efficiently detected. Thus, the components with remarkable temperature rise can be easily distinguished.

Preferably, a bimetal is used as the temperature responsive element so that, when the bimetal temperature reaches the predetermined temperature, the bimetal opens its inner contact so as to shut off the current carried to the coil, thereby simplifying a structure and reducing cost of temperature-responsive motor control structure.

Preferably, the heat transfer member is made up of either plural members or a single member. When the heat transfer member is made up of plural members, it is made up of a switch supporting member for supporting the magnet switch and a brush holder for supporting the brushes with the switch supporting member and the brush holder being thermally in contact with each other. When the heat transfer member is made up of a single member, a supporting portion for supporting the magnet switch can be provided integrally with the brush holder.

BRIEF DESCRIPTION OF THE DRAWINGS

Other objects, features and advantages of the present invention will become more apparent from the following detailed description when read in conjunction with reference to the accompanying drawings, in which.

DETAILED DESCRIPTION OF THE PRESENTLY PREFERRED EMBODIMENTS

The starter according to the present invention will be described with reference to the preferred embodiments.

(FIRST EMBODIMENT)

Figure 1:
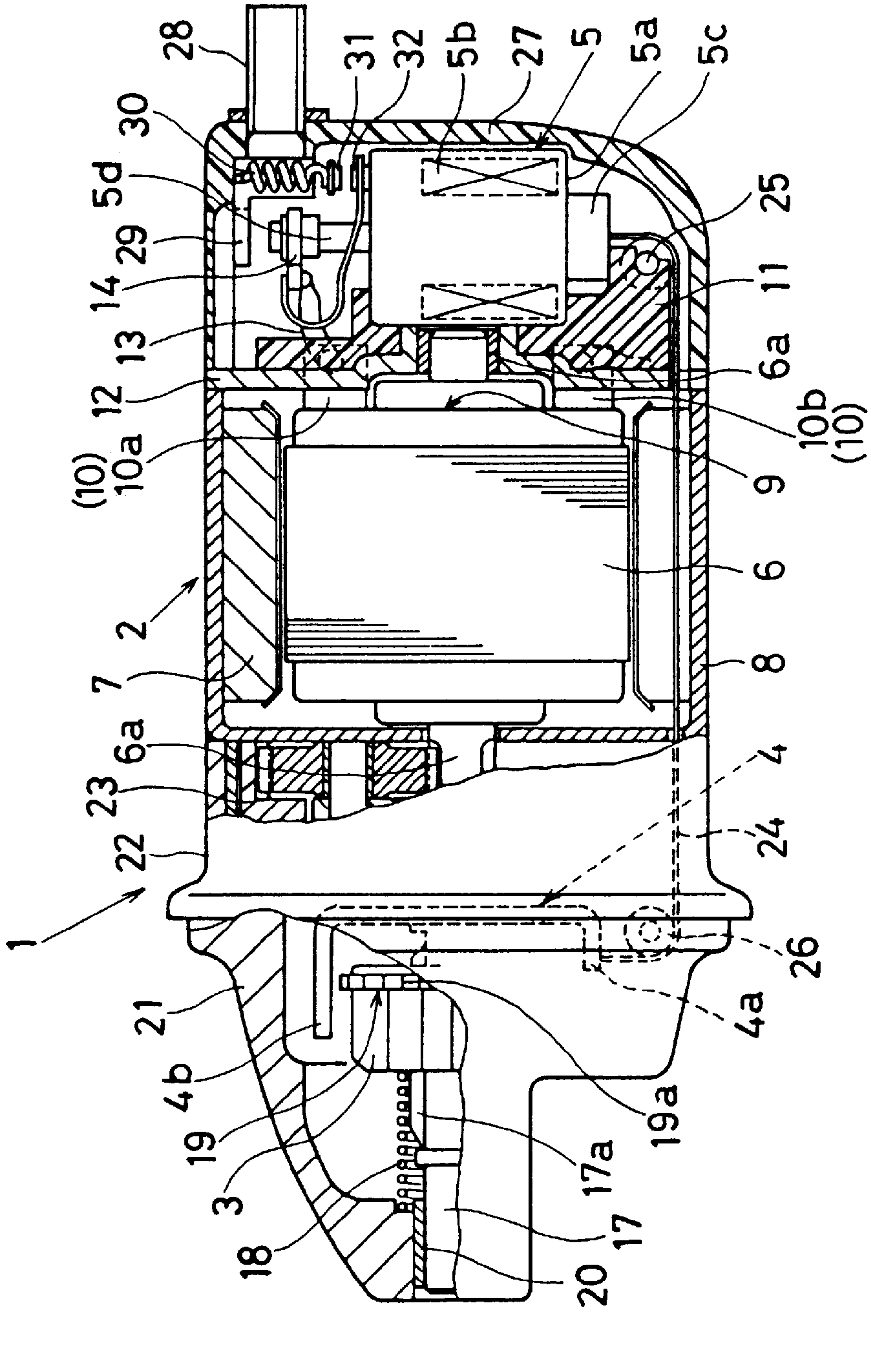
FIG. 1 is a cross-sectional view illustrating a structure of a starter.
Figure 2:
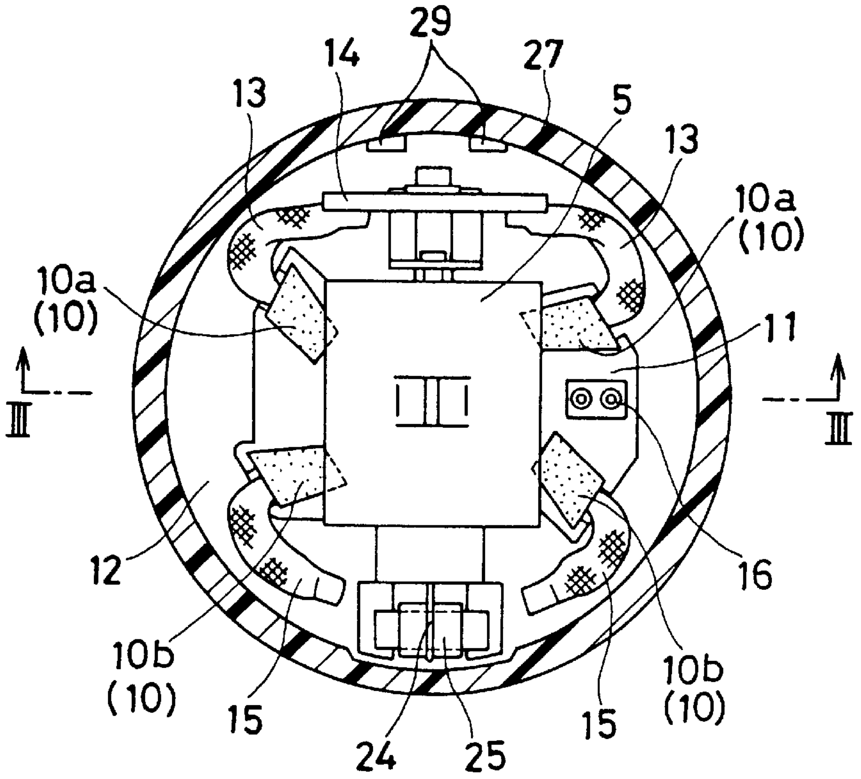
FIG. 2 is a plan view illustrating an inner structure of an end cover which is illustrated in section.
Figure 3:
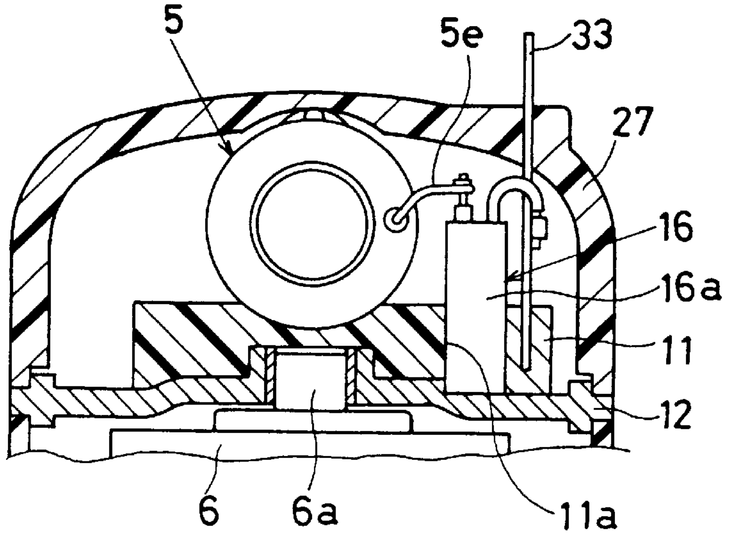
FIG. 3 is a cross-sectional view taken along the line III—III in FIG. 2.

A starter 1 according to the present embodiment, as illustrated in FIGS. 1 through 3, includes a rotation limiting member 4 which controls the rotation of a pinion 3 when a motor 2 is started. The starter has a structure in which rotation limiting member 4 is driven by a magnet switch 5 provided at the side of motor 2 reverse to the pinion 3.

Motor 2 is made up of a rotatably supported armature 6, fixed poles 7 (permanent magnets, for example) mounted around the outer periphery of armature 6, a cylindrical yoke 8 fixing fixed poles 7 to inner periphery thereof, brushes 10 contacting slidably with a commutator 9 formed on the rear end (the right end in FIG. 1) of armature 6, and so forth; however, commutator 9 is provided in a manner that the surface contacting slidably with brushes 10 makes a substantially right angle relative a rotary shaft 6*a* of armature 6.

Figure 4:
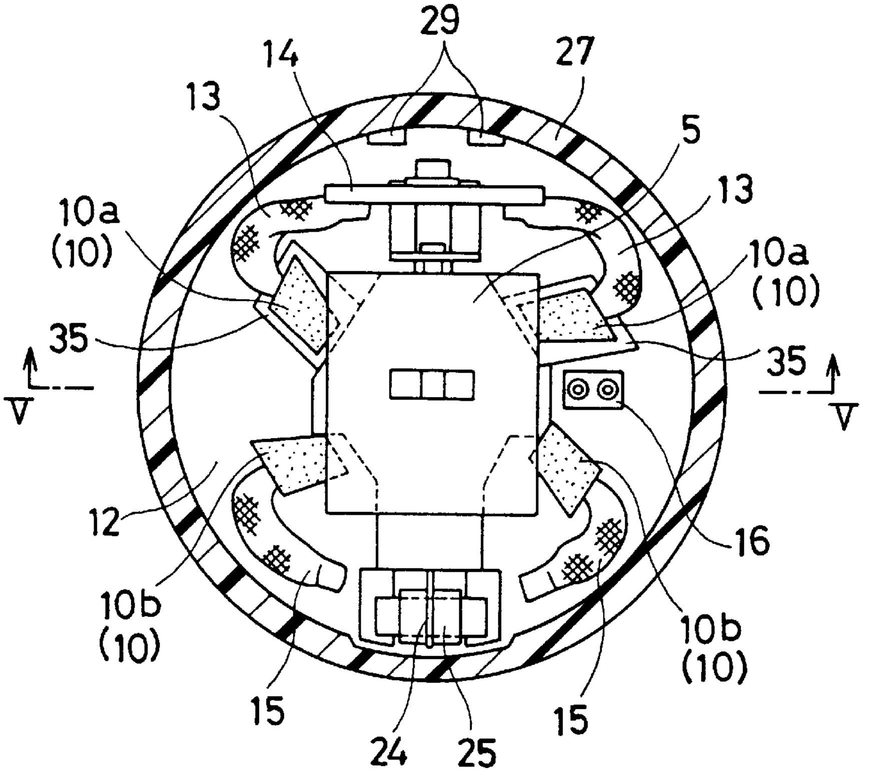
FIG. 4 is a plan view illustrating an inner structure of an end cover which is illustrated in section.

Brush 10 is constituted of two pairs of positive electrode brushes 10*a* and negative electrode brushes 10*b* and slidably inserted into brush sliding holes (not shown in the Figures) which are formed on a switch supporting member 11 (made of resin) to be supported by a brush holder 12 (made of metal), provided that positive electrode brushes 10*a* are supported by brush holder 12 via insulating member 35 (FIG. 4 described in a second embodiment). These positive electrode brushes 10*a* are connected electrically to a main movable contact 14 through lead wires 13, while negative electrode brushes 10*b* are electrically connected and grounded to brush holder 12 via lead wires 15.

Switch supporting member 11 is, as illustrated in FIG. 3, fixed to brush holder 12 in a press-fit condition so as to support magnet switch 5. In addition, an energization control unit 16 is installed in switch supporting member 11.

Pinion 3 includes a helical spline (not shown in the Figures) formed at the inner periphery thereof and fitted with a helical spline 17*a* formed on the outer periphery of an output shaft 17 so that pinion 3 can be engaged with a ring gear (not shown in the Figures) of an engine by shifting forward along helical spline 17*a* on output shaft 17. This pinion 3 is biased backward by means of a spring 18 disposed at the front end side of pinion 3. At the rear end of pinion 3 is integrally provided a rotation limiting plate 19 having an outer diameter larger than that of pinion 3. The outer peripheral surface of rotation limiting plate 19 has a large number of engaging grooves 19*a* formed to extend in the axial direction and formed at equal intervals along the outer circumference of rotation limiting plate 19.

Output shaft 17 is disposed in front of armature 6 coaxially with rotary shaft 6*a* with its front end supported rotatably by a front housing 21 via a bearing 20 and its rear end supported rotatably by a center case 22 via a bearing (not shown in the Figures).

Center case 22 is provided between front housing 21 and yoke 8 so as to cover the outer periphery of rotary force transmitting mechanism 23 for transmitting rotary force of motor 2 to output shaft 17. Rotary force transmitting mechanism 23 is made up of a planetary gear speed reducing mechanism and an overrunning clutch, both of which are well known in structure, and description thereof is omitted.

Rotation limiting member 4 is supported movably in a vertical direction (up and down direction in FIG. 1) with restriction of axial movement against center case 22 and normally urged upward by a return springs (not shown in the Figures). Rotation limiting member 4 is made of bar-shaped metal. Both end portions 4*a* and 4*b* of the metal are bent up at the right angle in the same direction. One bent-up end portion 4*a* is connected to one end of a cord-shaped wire 24 which transmits the operation of magnet switch 5. Namely, when magnet switch 5 pulls via cord-shaped wire 24, with the rotation limiting member 4 moving downward against spring force of the return spring, the other bent end portion 4*b* is engaged with engaging grooves 19*a* formed on the outer periphery of rotation limiting plate 19 so as to limit the rotation of pinion 3. When magnet switch 5 is turned off, rotation limiting member 4 is urged upward by means of the spring force of the return spring to return to its original position (the position illustrated in FIG. 1). Further, cord-shaped wire 24 is guided by a roller 25 fixed to switch supporting member 11 and a roller 26 fixed to center case 22 in order to transmit the operation of magnet switch 5 to rotation limiting member 4.

Magnet switch 5 is disposed in such a way that the operating direction (up and down direction in FIG. 1) thereof is at right angle to the rotary shaft 6*a* of armature 6 in end cover 27, and clamped between end cover 27 and the switch supporting member 11 which holds one part of switch yoke 5*a* (FIG. 2). This magnet switch 5 includes a coil 5*b* inside switch yoke 5*a*, which pulls a plunger 5*c* disposed in a hollow portion of coil 5*b* by magnetic force when a starter switch (not shown in the Figures) is turned on to carry current to coil 5*b*. Consequently, a rod 5*d* fixed to plunger 5*c* is pushed out (upward in FIG. 1) and drives rotation limiting member 4 via the cord-shaped wire 24 with a motor contact (which is described later) closed. In addition, cord-shaped wire 24 has other end connected to the bottom of plunger 5*c*.

The motor contact is made up of a main fixed contact 29 fixed to a power terminal 28 which is connected to a storage battery, a main movable contact 14 movable to main fixed contact 29, a resistor 30 connected electrically to power terminal 28, a secondary fixed contact 31 connected to power terminal 28 through resistor 30 and a secondary movable contact 32 movable to secondary fixed contact 31. The distance between secondary movable contact 32 and secondary fixed contact 31 is set smaller than the space between main movable contact 14 and main fixed contact 29. Accordingly, when rod 5*d* is pushed out by the operation of magnet switch 5, secondary movable contact 32 comes into contact with secondary fixed contact 31 before main movable contact 14 touches main fixed contact 29 so that the battery voltage is applied to motor 2 via resistor 30. After that, as main movable contact 14 comes into contact with main fixed contact 29 to short resistor 30, the full battery voltage is applied to motor 2.

The above-mentioned energization control unit 16 is for accommodating a normally-closed bimetal having its case 16*a* including a contact therein. As illustrated in FIG. 3, one part or the full length of case 16*a* is inserted into holding hole 11*a* formed on switch supporting member 11 so as to be supported in a manner that the bottom surface of case 16*a* is stuck to brush holder 12 in the heat transfer relation. The inner contact of case 16*a* is connected between a switch terminal 33 connected to the starter switch and a lead wire 5*e* of positive side of coil 5*b*. This energization control unit 16 has the bimetal which opens the inner contact to shut off the current carried to coil 5*b* when the temperature of the heat transmitted via switch supporting member 11 and brush holder 12 (the heat of coil 5*b* and the heat of brush 10 transmitted via switch yoke 5*a*) reaches the predetermined temperature (for example, 150° C.). As illustrated in FIGS. 2 and 3, it is preferable to dispose energization control unit 16 between brushes 10*a* and 10*b* supported by brush holder 12 and switch yoke 5*a*.

Next, the operation of starter will now be described.

When the starter switch is turned on to operate magnet switch 5, as cord-shaped member 24 is pulled to the side of magnet switch 5 with the movement of plunger 5*c*, rotation limiting member 4 moves downward along center case 22. Consequently, other end portion 4*b* of rotation limiting member 4 is engaged with the engaging groove 19*a* of rotation limiting plate 19 so that the rotation of pinion 3 is limited.

On the other hand, as secondary movable contact 32 comes into contact with secondary fixed contact 31 in the first place after plunger 5*c* is pulled so as to move rod 5*d* upward, motor 2 is started in low voltage. The rotation of motor 2 is decelerated at the planetary gear speed reducing mechanism and transmitted to output shaft 17, thereby rotating output shaft 17 at low speeds. By means of the rotation of output shaft 17, pinion 3 tends to rotate; however, since rotation limiting member 4 limits the rotation of pinion 3, the rotary force of output shaft 17 acts as thrust for pushing pinion 3 in the axial direction. Consequently, pinion 3 can be engaged with the ring gear by moving forward on output shaft 17 along helical spline 17*a*.

After that, when pinion 3 is engaged with the ring gear completely, the other end portion 4*b* separates from engaging groove 19*a* of rotation limiting plate 19 and drops into the rear end side of rotation limiting plate 19 so that the limitation on rotating pinion 3 is released. Accordingly, as plunger 5*c* is further pulled, main movable contact 14 comes into contact with main fixed contact 29 to conduct therewith and the rated full battery voltage is applied to motor 2 to rotate armature 6 at high speeds. Therefore, the rotary force is transmitted to the ring gear engaged with pinion 3 so that the engine can be started.

Further, after starting the engine, when pinion 3 is rotated by the ring gear, the rotary force of the engine exerts in the direction to move the pinion 3 back by means of the action of helical spline 17*a*. However, since the rear end surface of rotation limiting plate 19 is supported by other end portion 4*b* of rotation limiting member 4 which is dropped into the rear end side of rotation limiting plate 19, the retreat of pinion 3 can be prevented.

Then, when the starter switch is turned off and stops energization to coil 5*b,* since the plunger 5*c* pulled till that time returns to the initial position, main movable contact 14 and secondary movable contact 32 are separated from main fixed contact 29 and secondary fixed contact 31 respectively to cease motor energization so that the rotation of armature 6 is terminated. As the force to pull rotation limiting member 4 via cord-shaped member 24 is ceased with the return of plunger 5*c,* rotation limiting member 4 returns to the initial position by means of the spring force of the return spring. In consequence, since other end portion 4*b* of rotation limiting member 4, which has prevented the withdrawal of pinion 3, separates from rotation limiting plate 19, pinion 3 returns to its initial position (the position illustrated in FIG. 1) by means of the urging force of spring 18 and the retreating force from the ring gear.

The operation of energization control unit 16 will now be described.

In either case where the starter 1 is driven for a long time when the engine is not started with ease or where the starter is driven in the overloaded condition with high resistance of starting engine because of low temperature condition, the temperature of motor 2 is increased rapidly. Accordingly, the heat of motor 2 is transmitted to brushes 10 which are slidably contacted to commutator 9, and with the sliding heat generated between brushes 10 and commutator 9, the temperature of brushes 10 is increased. The heat of brushes 10 is transmitted to the bimetal of energization control unit 16 via brush holder 12 supporting brushes 10, and when the temperature of the heat reaches the predetermined temperature, the bimetal opens its inner contact. The conduction between switch terminal 33 and lead wire 5*e* is shut off so that the current carried to coil 5*b* is terminated or deenergized.

Meanwhile, in any cases where motor 2 is driven in nonloaded condition due to, for instance, magnet switch failure after the engine is started, the temperature rise of motor 2 is low, but coil 5*b* of magnet switch 5 is overheated and its temperature is raised. Accordingly, the heat transmitted to switch supporting member 11 through switch yoke 5*a* is transferred to the bimetal of energization control unit 16. When the heat temperature reaches the predetermined temperature, the bimetal opens its inner contact to terminate the current carried to coil 5*b* as mentioned above.

According to the present embodiment, the heat generated from coil 5*b* and the heat transmitted from motor 2 to brushes 10 are transferred to the same bimetal via switch supporting member 11 and brush holder 12. By setting the bimetal to open its inner contact when its temperature attains the predetermined temperature or more, thermal damage to starter 1 can be prevented over a wide starter operation range from almost nonloaded motor operation to loaded motor operation. Further, since energization control unit 16 is disposed between switch yoke 5*a* and brushes 10*a* and 10*b,* the higher temperature between switch yoke 5*a* and brushes 10*a* and 10*b* can be easily detected, thereby preventing the thermal damage efficiently whichever temperature rise is remarkable.

(SECOND EMBODIMENT)

Figure 5:
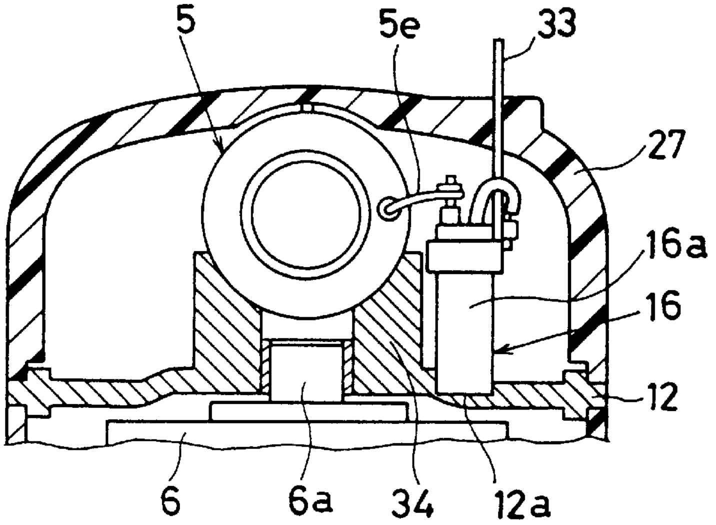
FIG. 5 is a cross-sectional view taken along the line V—V in FIG. 4.

As illustrated in FIGS. 4 and 5, a second embodiment of the present invention provides an example in which a supporting portion 34 for supporting magnet switch 5 is integrally formed with brush holder 12 made of metal. Energization control unit 16 is directly supported in a holding hole 12*a* formed on brush holder 12.

According to the present embodiment, because brush holder 12 is made of metal (aluminum, for example) which has good heat conductivity, the metal brush holder improves heat transfer from switch yoke 5*a* of magnet switch 5 and brushes 10 to the bimetal in energization control unit 16, thereby detecting the temperature of coil 5*b* and the temperature of brush 10 precisely.

(MODIFICATION OF THE EMBODIMENTS)

The above-described embodiments use a face-type commutator 9, but a cylindrical commutator can be used alternatively.

For energization control unit 16, whereas a bimetal having its case 16*a* with a contact therein is exemplified in the embodiments, a temperature sensor (thermistor) may be used as temperature responsive element instead of the bimetal.

Furthermore, the embodiments have such a structure that the heat of coil 5*b* is transferred via switch yoke 5*a* to switch supporting member 11 (in the first embodiment) or to brush holder 12 (in the second embodiment). The temperature responsive element may be installed directly to switch yoke 5*a* so that the heat from brushes 10 is transferred to the temperature responsive element.

Various other modifications and changes may be made as well without departing from the spirit and scope of the present invention.

What is claimed is:

1. A starter comprising:

a motor including an armature, a commutator disposed at one axial end of said armature and brushes slidably contacting said commutator, wherein said motor generates a rotary force by an electric current carried through said brushes and said commutator;

a magnet switch having a switch yoke, a coil contained in said switch yoke and a motor contact, said magnet switch being disposed axially adjacent to said commutator, wherein said magnet switch closes said motor contact for supplying the electric current to said brushes by energization of said coil;

a heat transfer member provided in heat transfer relation to said brushes of said motor and said switch yoke of said magnet switch; and energization control means including a temperature responsive element responsive to a temperature of said heat transfer member, said energization control means shutting off energization of said coil when the heat transfer member temperature reaches a predetermined temperature thereby providing overheat protection to the starter in response to a high temperature of one of said motor and said magnet switch.

2. A starter according to claim 1, wherein said temperature responsive element is disposed between said switch yoke and said brushes.

3. A starter according to claim 1, wherein said energization control means includes a bimetal as said temperature responsive element and said bimetal opens its inner contact to shut off the current carried to said coil when said bimetal reaches said predetermined temperature.

4. A starer according to claim 1, wherein said heat transfer member includes a brush holder made of metal and holding said brushes and said magnet switch in direct contact therewith.

5. A starter according to claim 2, wherein said energization control means includes a bimetal as said temperature responsive element and said bimetal opens its inner contact to shut off the current carried to said coil when said bimetal reaches said predetermined temperature.

6. A starter according to claim 2, wherein said heat transfer member is made up of a switch supporting member for supporting said magnet switch thereon and a brush holder made of metal for slidably holding said brushes.

7. A starer according to claim 2, wherein said heat transfer member includes a brush holder made of metal and holding said brushes and said magnet switch in direct contact therewith.

8. A starter according to claim 3, wherein said heat transfer member is made up of a switch supporting member for supporting said magnet switch thereon and a brush holder made of metal for slidably holding said brushes.

9. A starer according to claim 3, wherein said heat transfer member includes a brush holder made of metal and holding said brushes and said magnet switch in direct contact therewith.

10. A starter comprising:

a motor including an armature, a commutator disposed at one axial end of said armature and brushes slidably contacting said commutator, said motor for generating a rotary force by an electric current carried through said brushes and said commutator;

a magnet switch having a switch yoke, a coil contained in said switch yoke and a motor contact, said magnet switch being disposed axially adjacent to said commutator, said coil for closing said motor contact for supplying the electric current to said brushes through said motor contact when energized;

a heat transfer member provided in heat transfer relation to said brushes of said motor and said switch yoke of said magnet switch; and energization control means including a single temperature responsive element responsive to a temperature of said heat transfer member, said energization control means shutting off energization of said coil when the heat transfer member temperature of said heat transfer member reaches a predetermined temperature thereby providing overheat protection to the starter in response to a high temperature of one of said motor and said magnet switch.

11. A starter according to claim 10, wherein said temperature responsive element is disposed between said switch yoke and said brushes.

12. A starter according to claim 10, wherein said energization control means includes a bimetal connected in a current carrying path to said coil as said temperature responsive element, and said bimetal opens said current carrying path to shut off the current carried to said coil when said bimetal reaches said predetermined temperature.

13. A starter according to claim 10, wherein said heat transfer member is made up of a switch supporting member for supporting said magnet switch thereon and a brush holder made of metal for slidably holding said brushes.

14. A starter according to claim 10, wherein said heat transfer member includes a brush holder made of metal and holding said brushes and said magnet switch in direct contact therewith.

15. A starter according to claim 10, further comprising:

a brush holder for holding said brushes slidably; and an end cover enclosing said magnet switch therein and fixed to said brush holder wherein said energization control means is disposed within a space defined by said brush holder and said end cover.

16. A starter comprising:

a motor including an armature, a commutator disposed at one axial end of said armature and brushes slidably contacting said commutator, wherein said motor generates a rotary force by an electric current carried through said brushes and said commutator;

a magnet switch having a switch yoke, a coil contained in said switch yoke and a motor contact, said magnet switch being disposed axially adjacent to said commutator, wherein said magnet switch closes said motor contact for supplying the electric current to said brushes by energization of said coil;

a heat transfer member provided in heat transfer relation to said brush and said switch yoke; and energization control means including a temperature responsive element responsive to a temperature of said heat transfer member, said energization control means shutting off energization of said coil when the temperature reaches a predetermined temperature, wherein said heat transfer member further comprises a switch supporting member for supporting said magnet switch thereon and a brush holder made of metal for slidably holding said brushes.

* * * * *